J. D. Field,
Pipe Joint.
No. 101,603. Patented Apr. 5, 1870.
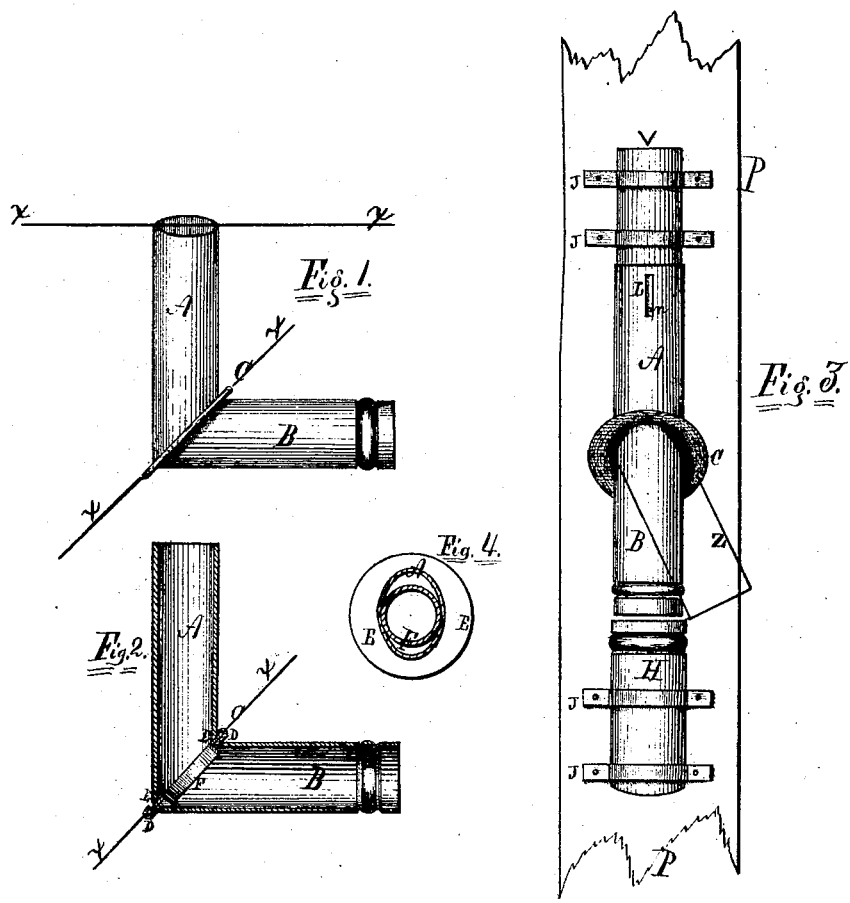

United States Patent Office.

J. D. FIELD, OF WATAGA, ILLINOIS.

Letters Patent No. 101,603, dated April 5, 1870; antedated April 1, 1870.

IMPROVEMENT IN ADJUSTABLE ELBOW-JOINTS FOR WATER-PIPES.

The Schedule referred to in these Letters Patent and making part of the same.

*To all whom it may concern:*

Be it known that I, J. D. FIELD, of Wataga, in the county of Knox and State of Illinois, have invented certain new and useful Improvements in "Adjustable Elbow-Joints for Pipes;" and I do hereby declare that the following is a full, clear, and exact description of the same, reference being had to the accompanying drawings making a portion of this specification, in which—

Figure 1 is an elevation, showing the device with the pipe bent at right angles, or so as to form an "elbow-joint."

Figure 2 is a vertical sectional view of fig. 1, showing the construction of the joint.

Figure 3 is an elevation, showing the joint with the pipe straight.

Figure 4 is a cross-section of fig. 1 on the line $x\,x$.

Similar letters of reference indicate corresponding parts in all of the figures.

The nature of this invention relates to an improved adjustable joint for pipes; and The invention consists in cutting the ends of two pipes (of which the "elbow" is to be formed) at the usual angle for making a right-angled elbow. To one of said bevels a circular disk is attached, somewhat larger than the end of the pipe, and having a hole for the passage of water or smoke. To the other bevel is attached a somewhat larger disk than the other, and provided also with an opening in its center, corresponding with the opening in the pipe. This disk is "turned over" around the edge, and made to clasp the first-named one loosely, so that they may be revolved with their faces or flat surfaces in contact.

The invention further consists in attaching to the first-named disk a short pipe, corresponding with the hole in said disk, and extending a short distance into the other pipe.

To enable others to understand the construction and operation of my invention, I will proceed to describe it with reference to the drawings.

A represents an ordinary joint or piece of metallic pipe, with one end cut off at an angle of about forty-five degrees.

B represents a similar pipe to A.

E represents a circular disk, of sheet metal, or its equivalent. This disk E is soldered or otherwise attached firmly to the beveled end of the pipe A, and is pierced with a circular hole.

F represents a short piece of pipe, say two to four inches in length, corresponding in diameter to the hole in the disk E, and attached firmly to said disk around said opening, for the purpose of conducting the water past the joint, which must, of necessity, from its construction, not be water-tight.

D represents a circular disk, a little larger in diameter than the disk E, so that its outer edge may be turned over the disk E, as shown at fig. 2, allowing the disks to be rotated freely in opposite directions, their faces touching. This disk D is pierced with a circular hole, fitting to, and through which the short pipe F passes. The disk D is attached securely to the pipe B.

The operation of my invention is deemed plain from an inspection of the drawings.

Fig. 3 shows the joint when in a straight line, and one application of it to a water pipe, P being the building, V, a straight pipe, with a pin, $n$, over which the slot L in the pipe A slides.

H is another joint of straight pipe.

The pipes A B, while straight, may be slid down, and the pipe B connected with the pipe H, or being slid up, the pipe B may be turned off, as shown by red line Z.

The joint may be turned to form a straight pipe, or it may be turned to form an elbow at any angle between a straight line and a right angle.

I do not claim as new the outer arrangement of the flanges, whereby the adjustability of the pipes is secured; but What I do claim as new, and desire to secure by Letters Patent, is—

The pipe F, combined and arranged with the disks D and E, substantially as described and for the purpose set forth.

Signed at Galesburg, Illinois, this 4th day of May, 1869.

J. D. FIELD.

Witnesses:
G. C. LAUPHUE,
J. B. HARSH.